United States Patent [19]

Tate et al.

[11] Patent Number: 4,785,725
[45] Date of Patent: Nov. 22, 1988

[54] AUTOMATIC COOKING MACHINE

[75] Inventors: Maurice Tate, Orange County, Fla.; Robert L. Thompson; John H. Wilbur, both of Benton County, Wash.

[73] Assignee: U1 Group, Salt Lake City, Utah

[21] Appl. No.: 834,206

[22] Filed: Feb. 27, 1986

Related U.S. Application Data

[63] Continuation of Ser. No. 683,114, Dec. 17, 1984, abandoned.

[51] Int. Cl.$^4$ ............................................. A47J 37/12
[52] U.S. Cl. .................................... 99/330; 99/331; 99/336; 99/337; 99/344; 99/407; 55/DIG. 36; 169/23; 169/65
[58] Field of Search ............... 169/23, 65; 99/330, 99/331, 336, 337, 342, 344, 403, 407; 55/DIG. 36, 316

[56] References Cited

U.S. PATENT DOCUMENTS

| | | | |
|---|---|---|---|
| 1,713,303 | 5/1929 | Serrell | 99/400 |
| 1,994,894 | 3/1935 | Marcotte | 99/444 |
| 2,097,793 | 11/1937 | Howell | 99/400 |
| 3,512,473 | 5/1970 | Moore | 99/407 |
| 3,596,591 | 8/1971 | Spates | 99/400 |
| 3,818,820 | 6/1974 | Harris | 99/407 |
| 4,356,870 | 11/1982 | Gaylord | 169/65 |
| 4,457,947 | 7/1984 | Schmidt | 99/407 X |
| 4,505,194 | 3/1985 | Bishop | 99/337 X |

*Primary Examiner*—Billy J. Wilhite
*Attorney, Agent, or Firm*—Seed & Berry

[57] ABSTRACT

An improved automatic french frying machine and method uses a supply of cooking oil which remains in a cooking vat during normal operation and is heated directly in the cooking vat. A system of thermostats combines with a heating element within the cooking vat to ensure proper cooking temperature and safe operation. An automatic initialization and monitoring system ensures safe startup and operation. Preferred embodiments also include an automatic flushing cycle which is activated at predetermined intervals to clean the cooking vat and replenish the cooking oil within the vat. A specially shaped cooking vat ensures that food particles will be removed from the vat during the flushing cycle. Oil degradation is minimized by either an open-topped cooking vat or a cooking vat having a lid which remains open during cooking.

5 Claims, 5 Drawing Sheets

AUTOMATIC COOKING MACHINE

This application is a continuation of U.S. patent application Ser. No. 683,114, filed Dec. 17, 1984, now abandoned.

DESCRIPTION

1. Technical Field

This invention relates to an improved apparatus for automatically frying individual portions of food.

2. Background Art

A consumer-operated machine for automatically frying food is disclosed in U.S. Pat. No. 4,457,947, to Dieter Schmidt et al. Machines of this type allow a consumer to automatically fry a portion of food by inserting the food into the machine in an open-top container and activating the machine. The food will then be automatically dumped out of the container and into a basket for frying in a cooking vat. After a predetermined cooking time, the food is automatically dumped out of the basket and back into the same cartridge. The machine then signals the consumer that the food can be removed for consumption.

Automatic frying machines of the type described above are typically operated in convenience stores or cafeterias where they are left unattended for extended periods of time. It is important that the machines operate safely during unattended periods without operator servicing or maintenance.

In this regard, the machine must provide high-grade cooking oil at a preferred range of cooking temperatures during periods of unattended use. Cooking oil will degrade with extensive use or overheating. Also, the high temperature heating elements and cooking oil within such machines can produce a risk of fire or injury to users.

In the machine disclosed in the patent to Schmidt et al., cooking oil is heated in a relatively large, remote reservoir and continuously circulated into a smaller cooking vat to ensure that the cooking oil in the vat remains at a desired temperature. Additionally, a lid covers the cooking vat during cooking to minimize the oil fumes which escape from the cooking vat. Each of these features has been found to lead to premature degradation of certain cooking oils.

DISCLOSURE OF INVENTION

It is an object of this invention to provide an improved automatic frying machine for cooking individual food portions.

It is another object of this invention to provide such an improved machine which will minimize the degradation of the cooking oil used in the machine.

It is another object of the invention to provide such a machine which can be safely and automatically operated.

It is another object of this invention to provide such a machine which has improved protection against fires within the machine.

It is another object of this invention to provide an automatic frying machine which will automatically flush the cooking oil within the cooking vat at predetermined intervals.

It is another object of this invention to provide an automatic frying machine which minimizes the accumulation of food particles within the cooking vat.

These and other objects of the invention, which will become more apparent as the invention is described more fully below, are obtained by providing an improved automatic frying machine. In preferred embodiments, a supply of cooking oil remains in the cooking vat during normal operation and is heated directly in the cooking vat. A system of thermostats combines with a heating element within the cooking vat to ensure proper cooking temperature and safe operation. An automatic initialization and monitoring system ensures safe startup and operation. Preferred embodiments also include an automatic flushing cycle which is activated at predetermined intervals to clean the cooking vat and replenish the cooking oil within the vat. A specially shaped cooking vat ensures that food particles will be removed from the vat during the flushing cycle. An improved contain receptacle and basket improve the automatic dumping of the machine.

Preferred embodiments utilize either an opentopped cooking vat or a cooking vat having a lid which remains open during cooking to minimize oil degradation.

BEST MODE FOR CARRYING OUT THE INVENTION

An automatic frying machine 10 comprising a preferred embodiment of the present invention is illustrated in FIGS. 1–10. It is designed to cook food 12 held in an open-top container 14. The machine allows a consumer to insert the container into the machine, actuate the machine for the type of food to be fried, and have the food automatically fried and returned to its original container.

The preferred embodiment illustrated herein is designed to be used with food stored in containers such as the specially designed containers disclosed in U.S. Pat. No. 4,457,947, to Schmidt et al. Such containers include a detachable top (not shown) which is removed to leave an open-top container for inserting into machines of the present invention. The preferred embodiment could, of course, be modified to accept other containers, and it is not intended that the present invention be limited to use with an particular container.

Figure 8:
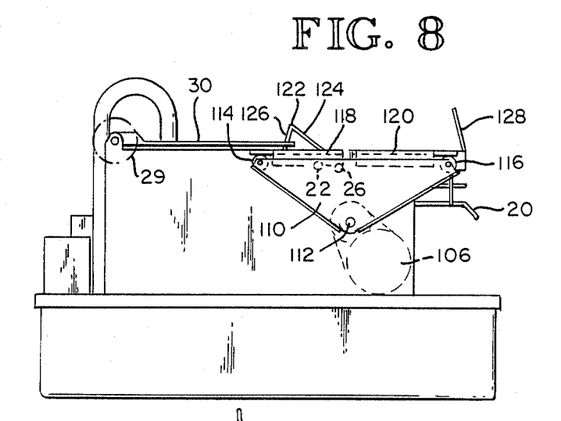
FIG. 8 is a right side elevation view of a preferred embodiment including a cooking vat lid, illustrating the linkage system for transporting the container receptacle and the basket during the dumping cycle.
Figure 9:
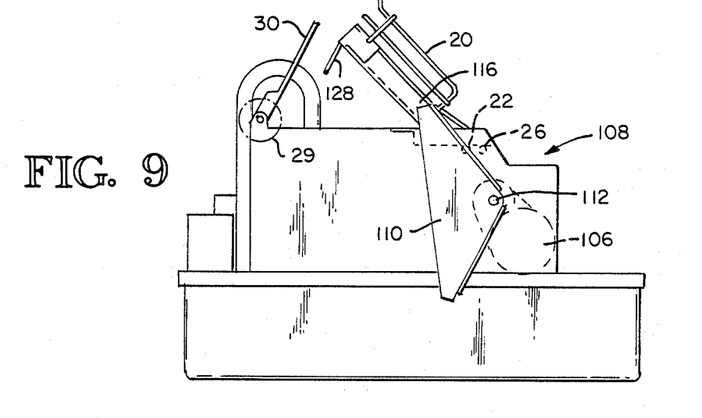
FIG. 9 is a right side elevation view per FIG. 8 illustrated with the receptacle in the dumping position.
Figure 10:
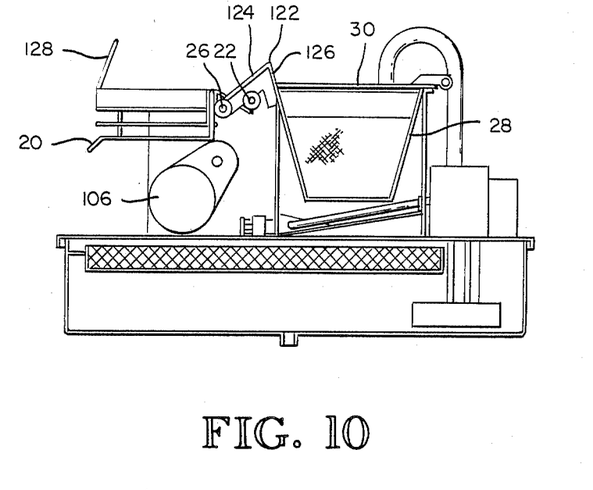
FIG. 10 is a left side elevational view of the embodiment of FIGS. 8 and 9 illustrated with the triangular plate removed for clarity. The basket is illustrated schematically.

In the preferred embodiment, food is transported from an access station (i.e. container 14) 14 into a cooking vat 16 and returned to the access station in basically the same manner as in the machine disclosed in the aforementioned patent to Schmidt et al. A consumer first opens the access door 18 at the front of the machine and then inserts the container of food into a container receptacle 20. The container and container receptacle are then rotated about a receptacle rod 22 to dump the food in the container into a cooking basket 28 located in the cooking vat. After a predetermined cooking time, the cooking basket is rotated about a basket rod 26 to raise the basket out of the cooking vat and dump the cooked food back into its original container. The operations of the dumping mechanism is illustrated in FIGS. 8-10 and described below in more detail.

While the prior work by Schmidt et al. encouraged the use of a cooking vat lid which remained closed during cooking, it has been found that sealing the cooking vat with a lid during cooking promotes premature degradation of cooking oil by trapping moisture in the cooking vat. Foods prepared for frying in an automatic frying machine of this type, particularly frozen, partially fried foods, generally have a high moisture content. It has been found that a closed lid during the cooking cycle contributes to early degradation of the cooking oil. Thus, preferred embodiments of the present invention either utilize an open-top cooking vat or employ a cooking vat lid 30 which remains open during cooking and closed only when the machine is not in use. Such a lid is preferably operated by a separate lid motor 29 which is actuated by the microprocessor to close the lid when the machine is not in use.

It has also been found that the heating and circulation system employed by Schmidt et al. and disclosed in U.S. Pat. No. 4,457,947 will lead to accelerated degradation of certain cooking oils. Continuous circulation of heated cooking oil from a remote oil reservoir into the cooking vat tends to aerate the cooking oil. Such aeration tend to degrade the cooking oil more rapidly than would otherwise occur.

Such aeration and consequent degradation are avoided in the preferred embodiment by providing a supply of cooking oil which preferably remains in the cooking vat during normal operation of the machine. A heating element 32 in the cooking vat combines with a system of thermostats 34, 36, 38 to ensure proper cooking temperatures within the cooking vat. A float 40 and level switch 39 coupled thereto monitor the cooking oil level within the vat to enable replenishment and safe operation, as described below in more detail.

Preferred embodiments of the present invention include a microprocessor unit 42 mounted on the front door of the machine. The microprocessor receives consumer input to begin operation of the cooking sequence and monitors and controls initialization of the machine as well as maintenance and safety functions described herein. The microprocessor is preferably programmed using standard techniques to carry out the logic sequences disclosed herein.

Figure 1:
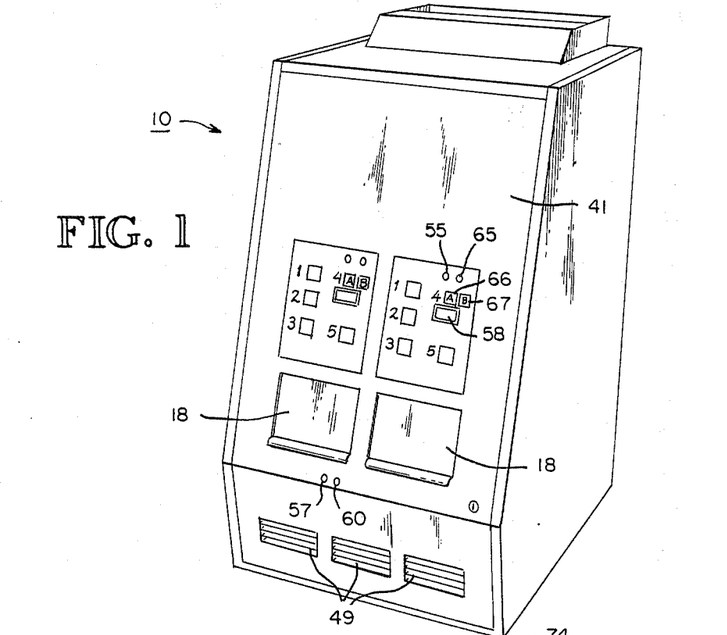
FIG. 1 is an isometric view of the exterior of a preferred embodiment of the invention.
Figure 2:
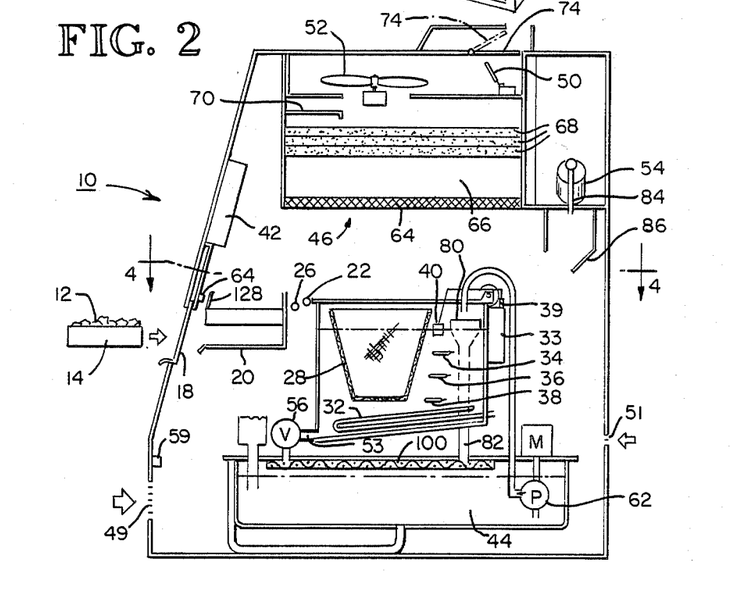
FIG. 2 is a side elevation view illustrating the interior of a preferred embodiment of the automatic frying machine of this invention, having no cooking vat lid.

The first step in the operation of the preferred embodiment of the automatic frying machine of the present invention is the operator setup and initialization. To begin operation, the operator opens the front door 41 of the machine and fills the oil reservoir 44 of the machine (if necessary) and turns on the machine. Cooking oil is poured into the reservoir through an inflow tube 45, the end of which is stored between a pair of spaced-apart fixture blocks 41 as shown in FIG. 2. An indicator 43 near the end of the tube marks the oil level corresponding to a fill reservoir and enables the operator to quickly check the fluid level and know if additional cooking oil should be added.

For the machine to operate after being turned on, three pre-initialization conditions must be present. First, the front cover 48 of the air filter system 46 must be closed. If the cover is not in place, air from within the machine can bypass the filtration system and escape from the machine. Unfiltered exhaust will result in the emission of odor and grease particles into the surrounding environment and is thus undesirable. Consequently, the machine is designed such that the front cover of the air filtration system must be closed for the machine to operate. A pair of microswitches (not shown) are positioned such that they are tripped when the cover is in place and will enable the machine power supply to operate.

Second, air circulation within the filtration system must be at an acceptable level. Air circulation within the machine is monitored by a vane switch 50 near the circulation fan 52, and the machine will be shut off should the air circulation within the air filtration system be insufficient to activate the vane switch.

Third, a fire extinguisher 54 located behind the air filtration system must be properly charged. A pressure valve (not shown) is coupled to the extinguisher and monitors the extinguisher pressure. The pressure valve is linked to the main electrical supply such that if the pressure within the fire extinguisher drops, the machine will stop operating. The microprocessor preferably monitors the pressure valve and will send a corresponding error code to the digit display if the fire extinguisher discharges or is inadequately charged.

After the operator has turned on the machine, if the pre-initialization conditions outlined above are met, the machine is ready for initialization. If any of these conditions fail during operation, the machine will shut off.

When the operator closes the door, the machine will begin its initialization cycle to set up the following conditions:

The frying basket is positioned above the cooking vat in the "idle position."
The cooking vat lid is closed (on embodiments including cooking vat lids).
The access door is closed.
The drain valve 56 for the cooking vat is open to allow oil to pass through the cooking vat drain 53.
The oil level sensor detects a low oil level.

When the initialization cycle begins, a check will be made by the machine to see if all the elements are properly in the initialized position. If they are not, the necessary motors are activated to move the frying basket, cooking vat lid and/or drain valve into the proper positions. If the access door is open, the "close door" light 55 on the front of the machine will be turned on to inform the user that the door needs to be shut.

If the corresponding motors do not move the elements into their initialized positions within a preset time, an error signal corresponding to the element which is not initialized will appear on the digital display 58 on the front of the machine and a "call operator" light 57 will be actuated. When this occurs, a beeping noise is preferably also produced by a horn 59 and the heating element is turned off. The air filtration system remains on, however, to continue to filter air within the machine.

THE PUMPING/FILLING CYCLE

If initialization has occurred properly, the machine is ready for the pumping/filling cycle to begin. This cycle ensures that a full vat of cooking oil is available for cooking at the desired temperature. After initialization, an amber "heating please wait" light 60 on the front of the machine is turned on. The drain valve is closed, an oil pump 62 is actuated to pump oil from the reservoir into the cooking vat, and a pump timer (not shown) within the microprocessor is actuated. Pumping continues until the level sensor detects that the fluid within the cooking vat has reached the desired level, or until the pump timer "times out." Anytime the pump is turned on, the timer is initialized to a predetermined time (about 5 minutes in the preferred embodiment) and a countdown begins. When the counter reaches zero, the pump has "timed out" and is shut off. The machine will then turn on the "call operator" light, send an error code to the digital display, and beeps the horn. The time selected for the countdown is preferably long enough to enable the vat to be filled should the viscosity of the oil be such that pumping is slow, yet short enough to eliminate unnecessary pumping should some problem arise.

By opening the cooking vat drain during initialization and filling the cooking vat at the beginning of the cooking cycle, the system ensures that the heating element is covered with oil before it is turned on. If the heating element is turned on without sufficient oil in the vat, it has been found that fires may develop within the machine. Any debris on the heating element will burn if the element is turned on with no cooking oil present. Additionally, if the cooking oil level is below the high temperature thermostat 34, heat from the heating element may bypass the thermostat and not activate it to shut off the element (as described below), thereby allowing the element to remain on indefinitely, possibly enabling any oil in the vat to ignite.

If the level switch turns off the pump and no error codes are present, the heating element is turned on at full intensity. In the preferred embodiment, full intensity is 3000 watts. The heating element heats the oil until it reaches the desired cooking temperature. When the desired cooking temperature is detected by the cook temperature thermostat, the heating element is switched to a pulsing mode for low-intensity heating (1500 watts). The machine then beeps, the cartridge access doors are unlocked by the door solenoid 64, the heating light goes off, and the "ready" light on the machine comes on, indicating that the machine is now ready for use by the consumer.

The two intensity levels of the heating element ensure rapid heating and minimum oil degradation. Localized heat produced by the higher setting will tend to degrade oil. At high wattage, the heating element will take a longer cool-down time when shut off by a thermostat and thus may heat the oil above the desired temperature. Consequently, once the oil has been heated during the initial cycle, the heating element remains at the low-intensity setting during normal usage.

The cooking oil reservoir includes a screen and paper filter tray 100 for filtering the cooking oil as it returns to the reservoir from the cooking vats. Additionally, a wire straining cage 102 preferably surrounds the pump to prevent large particles from entering the pump and clogging or damaging the pump.

COOKING VAT TEMPERATURE REGULATION

The temperature of the cooking oil within the cooking vat is monitored by three independent thermostats which extend into the cooking vat from a transport housing 33 behind the vat—a low temperature thermostat 34, a high temperature thermostat 38, and a cook temperature thermostat 36. The low temperature thermostat is set at the minimum acceptable cooking temperature and signals when the cooking oil temperature drops below an acceptable level. In the preferred embodiment, the low temperature thermostat is set at 325° F. If the temperature drops below that level, it may mean that the cooking oil level is below the thermostat and consequently there is too little oil in the cooking vat. Therefore, anytime the low temperature thermostat is activated, the cooking vat drain is opened to drain the vat. When the oil level sensor detects that the oil level is down, the drain will close and the pumping/filling cycle described above will begin.

The cook temperature thermostat is positioned in the vat at an elevation spaced apart from the heating element. It monitors the oil temperature and activates and deactivates the heating element to keep the cooking oil temperature in the range of 336° to 356° F.

The high temperature thermostat is set to shut off the heating element before the oil temperature level reaches a dangerous level. High-grade cooking oil will self-ignite at 675° F. and ignite from a spark at 475° F. In the preferred embodiment, the high temperature thermostat is set at 410° F.

THE COOKING CYCLE

To begin the cooking cycle of the machine, a consumer must open the access door, slide the container of food inside the receptacle, close the door, and push the start button 66 on the front of the machine. Step-by-step instructions (not shown) are preferably provided on the front of the machine to assist consumers. The microprocessor is preferably programmed so that the start button must be pushed with 45 seconds of the time that the door is opened. If the 45-second time period expires, the customer must restart the cycle by reopening the door.

In the preferred embodiment, two start buttons 66, 67 are provided so that a consumer may select the proper cooking time for the type of food to be cooked. The start buttons are labeled "A" and "B" and preferably are color coded to match similar markings on the food carton, thereby enabling consumers to easily determine which start button to use.

After the consumer has actuated the start button, the access doors are preferably locked in a closed position by a door lock solenoid 64. In preferred embodiments including a cooking vat lid, the machine will check to see if the cooking vat lid is open. If the lid is open, the basket motor will be actuated to dump the food into the basket and lower the basket into the cooking vat. The basket motor will then return the cartridge to the rest position while cooking takes place in the cooking vat. If the lid is closed, a lid motor will first be actuated to open the lid prior to dumping the food.

A cooking cycle timer (not shown) within the mciroprocessor is used to count down the time remaining during the cooking cycle and inform the consumer via the digital display how much time is left in the cooking cycle. When the consumer actuates the start button, the timer is set to the total process time. In the embodiments having a cooking vat lid, it is preferred that the counter start counting down when the basket motor starts to dump the food into the basket rather than when the start button is actuated to ensure a common cooking time irregardless of whether the lid is open or closed prior to commencement of the cooking cycle.

During cooking, the cooking vat lid remains open to allow moisture to escape from the cooking vat. Moisture will encourage degradation of the cooking oil; and consequently, it is preferred that the lid remain open during cooking, as the par-fried foods contain a considerable amount of moisture.

When the cooking timer indicates the completion of the cooking time, the basket motor is activated to raise the basket over the cooking vat. The basket is held in place for 10 seconds to allow the food to drain over the cooking vat. After 10 seconds, the motor moves the basket into the dump position to return the food to the cartridge and end the cooking cycle. A horn goes off, the "ready" light 65 comes back on, and the machine sits until the product is removed. The door lock solenoid will be deactivated to enable the consumer to open the access door. When the customer opens the access door, the timer (which was previously set at 000) is turned off, and the machine is ready for another cooking cycle.

THE FLUSHING CYCLE

The preferred embodiment includes a timed flushing cycle. A flushing timer (not shown) within the microprocessor is initialized to a preset time when the machine is turned on and begins to count down. After the machine has been on for the preset amount of time, the flushing timer will go off and the following operations will occur:

the access doors are locked;
the heating element is shut off;
the cooking vat drain valve is opened;
a timer is started; and
the "ready" light goes out and the "heating, please wait" light goes on.

When the drain valve has been open for a predetermined amount of time, the pump goes on for 15 seconds to flush crumbs and food particles out of the bottom of the cooking vat. This 15 second flush and drain sequence is repeated three times to ensure that crumbs and the like are removed. In the preferred embodiment, a motor driven ball valve is used for the drain valve. With each 15 second flush, the drain valve is automatically rotated 180° to an alternate open position. By rotating the valve, particles which might otherwise clog the drain are dislodged. As described below, the cooking vat is specially designed to include a sloped bottom leading to the vat drain to ensure that the majority of the crumbs, etc., will be removed from the cooking vat during the flushing cycle. After 15 seconds, the pump is shut off and the valve closes.

After the three flush and drain sequences are completed, the pumping/filling is then actuated to refill the cooking vat. The pump is turned on and the pump timer is started. The pump will continue to run until the level sensor indicates that the oil level within the cooking vat is at the desired level, or the pump times out. (This cycle is the same as after initialization.) After the pump is turned off by the level sensor, the heating element is turned on at high wattage until the proper cooking temperature is reached. The machine is then returned to an operating condition by unlocking the doors and turning the "ready" light back on.

A switch within the machine enables manual triggering of the flushing cycle. This manual retriggering also resets the flushing timer and can be used to set the flushing cycle to occur at times when the machine receives minimum use.

Once the cooking cycle is underway, it continues until one of the following occurs:

(a) The flushing timer expires.
(b) The temperature drops below the level at which the low temperature thermostat is set.
(c) The cooking oil level drops below the required fluid level (as detected by the float and level switch) and cannot be replenished. In this case, the machine shuts down completely.
(d) The air circulation, filter cover, or fire extinguisher pressure conditions are not met, as mentioned earlier.
(e) The operator unlocks and opens the front door of the machine.

The preferred embodiment also includes a maintenance switch (not shown) which can be manually triggered by the operator to activate the basket motor and lid motor to open the cooking vat lid and move the cooking basket into the cooking vat, thereby allowing easier access to certain parts of the machine for maintenance.

If the door to the machine is opened mid-cycle, the machine will automatically do a check of the pre-initialization conditions and re-initialize itself (see discussion above).

AIR FILTRATION SYSTEM

The air filtration system 46 of the present invention includes an impingement filter 64 at the bottom portion thereof. Above the impingement filter is an electrostatic air cleaner 66. In the preferred embodiment, a Honeywell air cleaner, Part No. FC37A, is employed, although other suitable electrostatic precipitators can be employed.

Above the electrostatic precipitator are three activated-charcoal filters 68 placed in series. A fragrance pack 70 is preferably positioned above the charcoal filters and below an exhaust fan 52. The exhaust fan draws air from within the machine and sends it out an exhaust port 72 at the top of the machine. Air inlets 49, 51 at the front and rear of the machine allow an inflow of circulation air. A vane switch 50 between the exhaust fan and the vent monitors the flow of air out of the machine. Should insufficient air circulation be present, the vane switch would be deactivated, causing the entire machine to be shut off. Deactivation of the vane switch will also register with the microprocessor which will send an error code to the digital display. The exhaust vent preferably includes a lid 74 which is pivotally mounted over the exhaust port and will automatically close if the fan stops operating. This lid will effectively seal off the machine in the event of a fire within the machine and prevent flames from exiting the machine during the fire, and also tend to suffocate combustion by breaking the flow path through the machine.

THE DUMPING MECHANISM

Figure 4:
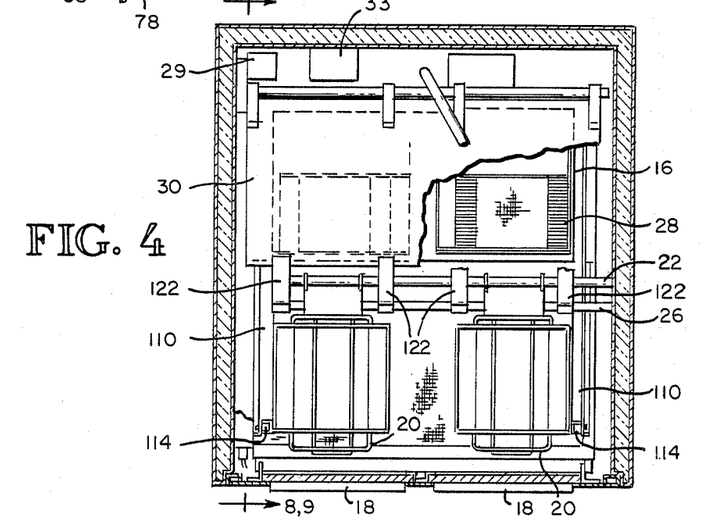
FIG. 4 is a top plan view of a preferred embodiment including a cooking vat lid. The air filtration system and fire extinguisher assembly are omitted for clarity.

The components of the dumping mechanism and operation of the dumping cycle are illustrated in FIGS. 4 and 7-10. A pair of container receptacles 20 are pivotally mounted on a receptacle rod 22 which extends transversely across the machine as illustrated in FIG. 4. Similarly, a pair of frying baskets 28 are pivotally mounted on a basket rod 26 which runs parallel to the receptacle rod.

A dumping motor 106 drives a pair of cam follower assemblies 108 to alternately engage and lift a container receptacle or basket and pivot it about the respective rod. The cam follower assembly includes a triangular plate 110 which is coupled to the dumping motor for clockwise and counterclockwise rotation about a pivot point 112 near one corner of the triangular plate. As illustrated in Figure 8, cam followers 114, 116 are mounted on the two remaining corners of the triangular plate to engage C-channel sections 118, 120 on the outer sides of the basket and container receptacle respectively.

At the beginning of the cooking cycle, the elements of the dumping mechanism are in the position illustrated in FIG. 8. The container receptacle is in the "idle position" behind the access door. The embodiment of FIG. 8 includes a cooking vat lid which is closed, indicating that the machine is not in use. The cooking basket is positioned inside the cooking vat. In embodiments which do not include a cooking vat lid, the basket can initially be placed in an idle position resting above and out of the cooking vat. In such embodiments, the basket must be lowered into the cooking vat at the beginning of a cook cycle.

FIG. 9 illustrates the position of the container receptacle and dumping mechanism when food is being dumped into the cooking vat. The triangular plate has rotated counterclockwise, causing the right cam follower 116 to engage the C-channel of the container receptacle and lift and rotate the receptacle into the dump position shown. The lever 122 which extends between the basket and the basket rod preferably includes an ascending surface 124 on the front side thereof and a descending surface 126 on the back side thereof to serve as a ramp for the back side of the receptacle as disclosed in the prior patent to Schmidt, et al.

After the food has been dumped into the cooking vat, the triangular plate is rotated clockwise to return the container receptacle to the idle position shown in FIG. 8. As described early, the cooking vat lid remains open during all cooking to allow moisture in the food to escape from the cooking vat. When cooking is complete, the triangular plate is again rotated clockwise, causing it to engage the C-channel of the basket and lift the basket out of the frying vat and into a dumping position over the container receptacle (which is still in the idle position). Cooked food will drop from the basket into a container within the receptacle, where it can be removed by the consumer when the access doors are unlocked. The basket can then be returned to an idle position above or within the cooking vat.

THE CONTAINER RECEPTACLE

Figure 3:
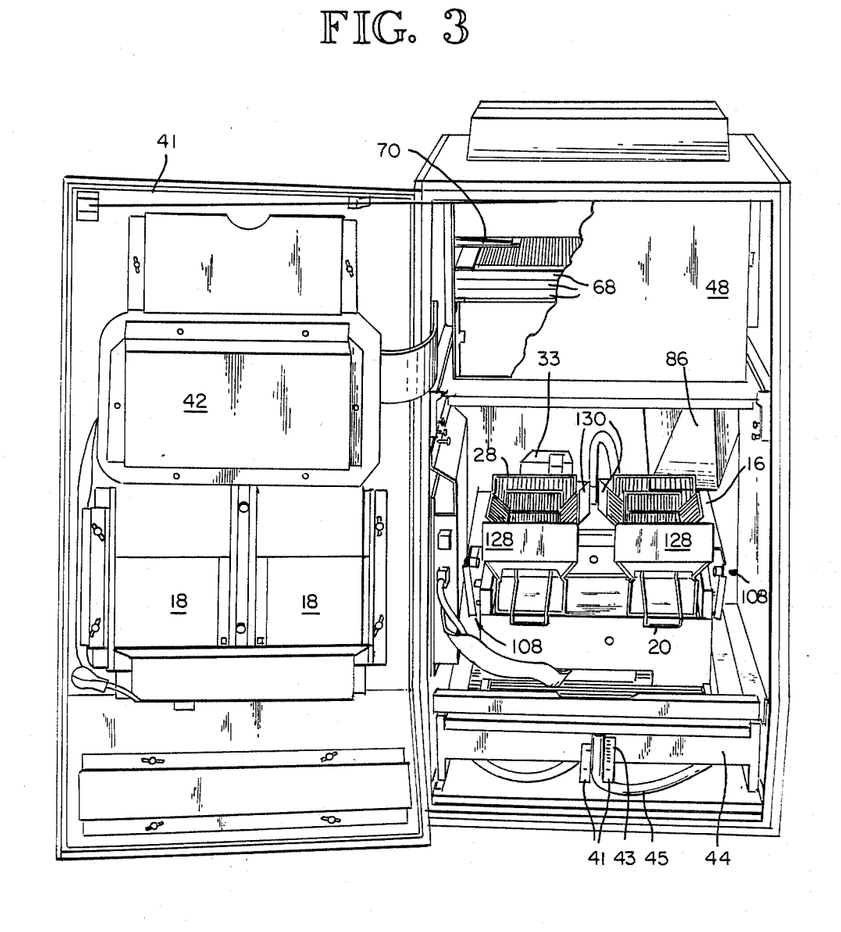
FIG. 3 is a front elevation view of the embodiment of FIG. 1 shown with the front door of the machine open. The front cover of the air circulation system is cut away to illustrate the interior thereof.

In the preferred embodiments disclosed herein, the automatic frying machine includes an improved container receptacle. In prior machines, food would sometimes miss its intended target during the dumping cycle. The container receptacle of the present invention includes a deflector 128 which extends upwardly and rearwardly from the front of the container receptacle as illustrated in FIG. 8. As seen in FIG. 3, the deflector extends transversely across the front of the container receptacle. When cooked food is being dumped from the basket into a container, the deflector will direct food into the container which might otherwise overshoot it (FIG. 8). Additionally, when food is being dumped into the cooking vat, the deflector will help direct the food into the basket which might owerwise land behind the cooking vat (FIG. 9).

THE FRYING BASKET

The preferred embodiments disclosed herein include frying baskets 28 having a unique and improved design. While FIGS. 2 and 10 illustrate the frying baskets schematically, the improved design can be seen in FIGS. 3 and 7. The integrity of the cooking oil will degrade rapidly if foreign particles, such as food, are allowed to cook continuously in the cooking vat. Also, food particles landing in the vat but not in the basket have been forced to interfere with the proper operation of the float and level switch mechanism. Thus, it is undesirable to allow food to miss the basket when it is dumped into the cooking vat. Food which lands in the cooking vat, but not in the basket, will continue to fry and burn in the cooking vat after the cooking cycle is over. The improved baskets of the present invention include upper surfaces which incline upwardly and outwardly as shown in FIG. 3 to deflect food into the basket. The interior sides of each basket include a solid plate portion 130 to provide added protection against food falling between the two baskets and into the cooking vat.

COOKING VAT

Figure 5:
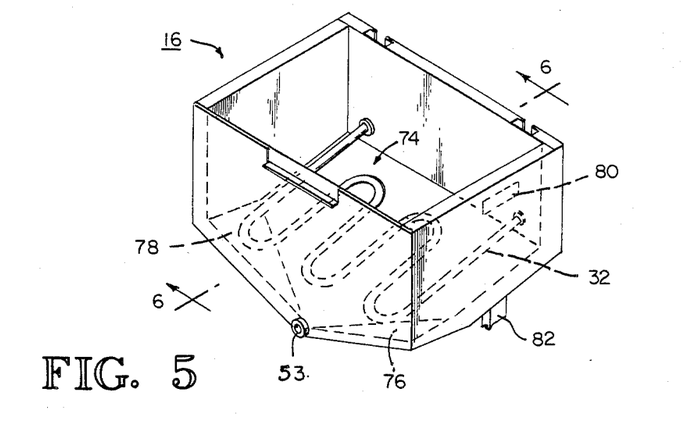
FIG. 5 is an isometric view of the cooking vat of the present invention.
Figure 6:
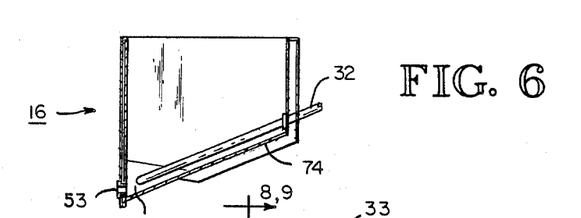
FIG. 6 is a cross-sectional view of the cooking vat of FIG. 5 taken through line 6—6 of FIG. 5.
Figure 7:
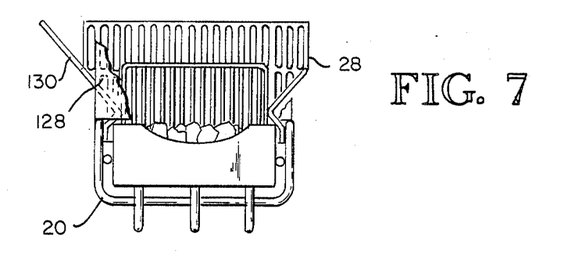
FIG. 7 is a front elevational view of the right container receptacle of the embodiment of FIG. 3, shown with the deflector plate cut away to illustrate the upper portion of the right basket.

The automatic frying machine of the present invention preferably includes a specially shaped cooking vat to facilitate removal of crumbs and the like from the cooking vat during the flushing cycle. As seen in FIG. 5, the cooking vat includes lower walls 74, 76 78 which slope downwardly to a drain at the front of the cooking vat. It has been found that the use of a cooking vat with a bottom sloped in this fashion will greatly enhance the effectiveness of the flushing cycle in removing crumbs and debris from the cooking vat. The cooking vat also includes an overflow drain 80 on the side thereof which communicates with an overflow drain pipe 82 to recycle oil to the reservoir in the event of an overflow.

FIRE EXTINGUISHER OPERATION

The fire extinguisher 54 is mounted behind the air filtration system and is coupled to a discharge nozzle 84 as illustrated in FIG. 2. The discharge nozzle is partially surrounded by a deflector 86, best illustrated in FIG. 3 which directs dry chemicals from the fire extinguisher toward the cooking vat. In the preferred embodiment illustrated herein, the fire extinguisher is activated by conventional means such as a glass bulb/stop at the end of the extinguisher which contains liquid which will explode the bulb at approximately 212° F. and allow material to exit the fire extinguisher. Once the fire extinguisher has discharged, the machine will automatically shut down and the pressure drop in the fire extinguisher will register at the microprocessor and cause a shutdown.

Although the invention has been described and disclosed herein with respect to particular embodiments of the invention, it is not intended that the invention be limited to these embodiments. Many modifications of the embodiments disclosed herein will be obvious to those skilled in the art. It is intended that the present invention encompass all embodiments within the spirit of the invention.

We claim:

1. An apparatus for automatically frying food stored in an open-top cartridge, the apparatus comprising:
    a cooking vat containing a cooking medium;
    a basket for holding the food in the vat;
    a receptacle for holding a cartridge, the receptacle being accessible from the exterior of the apparatus to allow insertion of a cartridge therein;
    means for automatically dumping the food out of the cartridge and into the basket for cooking;
    means for automatically dumping the cooked food out of the basket and back into the same cartridge; and
    means for automatically deactivating the apparatus at regular, apparatus-preset time intervals to render the apparatus temporarily inoperative for cooking, and automatically draining and flushing the cooking vat during such inoperative state to replenish the cooking medium within the cooking vat.

2. An apparatus for automatically frying food stored in an open-top cartridge, the apparatus comprising:
    a cooking vat containing a cooking medium;
    a basket for holding the food in the vat;
    a receptacle for holding a cartridge, the receptacle being accessible from the exterior of the apparatus to allow insertion of a cartridge therein;
    means for automatically dumping the food out of the cartridge and into the basket for cooking;
    means for automatically dumping the cooked food out of the basket and back into the same cartridge; and
    a fire extinguisher mounted in the apparatus, the fire extinguisher being directed at the cooking vat to dispense fire retardant into the cooking vat, the fire extinguisher including means for automatically actuating the fire extinguisher when the temperature within the apparatus reaches a predetermined level.

3. An apparatus for automatically frying food stored in an open-top cartridge, the apparatus comprising:
    a cooking vat containing a cooking medium;
    a basket for holding the food in the vat;
    a receptacle for holding a cartridge, the receptacle being accessible from the exterior of the apparatus to allow insertion of a cartridge therein;
    means for automatically dumping the food out of the cartridge and into the basket for cooking;
    means for automatically dumping the cooked food out of the basket and back into the same cartridge;
    a fire extinguisher mounted in the apparatus, the fire extinguisher being directed at the cooking vat to dispense fire retardant into the cooking vat, the fire extinguisher including means for automatically actuating the fire extinguisher when the temperature within the apparatus reaches a predetermined level; and
    means for monitoring the functions of the apparatus and preventing its operation unless the fire extinguisher is fully charged.

4. An apparatus for automatically frying food stored in an open-top cartridge, the apparatus comprising:
    a cooking vat containing a cooking medium;
    a basket for holding the food in the vat, the basket including a main body portion for holding food with the cooking vat and upper side portions which extend upwardly and outwardly from the main-body portion to deflect food into the basket when the food is automatically dumped into the cooking vat;
    a receptacle for holding a cartridge, the receptacle being accessible from the exterior of the apparatus to allow insertion of a cartridge therein;
    means for automatically dumping the food out of the cartridge and into the basket for cooking;
    means for automatically dumping the cooked food out of the basket and back into the same cartridge; and
    means for automatically flushing the cooking vat at preset time intervals to replenish the cooking medium within the cooking vat.

5. An apparatus for automatically frying food stored in an open-top cartridge, the apparatus comprising:
    a cooking vat containing a cooking medium;
    a basket for holding the food in the vat;
    a receptacle for holding a cartridge, the receptacle being accessible from the exterior of the apparatus to allow insertion of a cartridge therein, the receptacle having a main body portion for receiving the cartridge and a deflector plate extending inwardly and upwardly from the front of the main body portion, the deflector plate extending across substantially the entire front of the receptacle to deflect food particles into the cartridge during dumping;
    means for automatically dumping the food out of the cartridge and into the basket for cooking;
    means for automatically dumping the cooked food out of the basket and back into the same cartridge; and
    means for automatically flushing the cooking vat at preset time intervals to replenish the cooking medium within the cooking vat

* * * * *